(12) United States Patent
Rempel et al.

(10) Patent No.: US 12,722,888 B2
(45) Date of Patent: Sep. 1, 2026

(54) STORAGE DEVICE FOR MATERIAL PLATES

(71) Applicant: Strothmann Machines & Handling GmbH, Schloss Holte-Stukenbrock (DE)

(72) Inventors: Juri Rempel, Verl (DE); Tobias Schartner, Rheda-Wiedenbrück (DE)

(73) Assignee: Siempelkamp Transport Systems GmbH, Schloss Holte-Stukenbrock (DE)

(*) Notice: Subject to any disclaimer, the term of this patent is extended or adjusted under 35 U.S.C. 154(b) by 384 days.

(21) Appl. No.: 18/374,916

(22) Filed: Sep. 29, 2023

(65) Prior Publication Data

US 2024/0140706 A1 May 2, 2024

(30) Foreign Application Priority Data

Oct. 27, 2022 (DE) ........................ 102022004022.0

(51) Int. Cl.
*B65G 1/04* (2006.01)

(52) U.S. Cl.
CPC ...... *B65G 1/0492* (2013.01); *B65G 2201/022* (2013.01)

(58) Field of Classification Search
CPC .. B65G 1/0492; B65G 1/0428; B65G 1/0407; B65G 1/065; B65G 1/0414; B65G 2201/022
USPC .......................................................... 414/279
See application file for complete search history.

(56) References Cited

U.S. PATENT DOCUMENTS 6,294,981 B1 * 9/2001 Herrmannsdorfer ........................ G06K 17/0022 342/51
2015/0127143 A1 * 5/2015 Lindbo .................. G05B 15/02 700/218
2016/0016731 A1 * 1/2016 Razumov ............ B65G 1/0492 414/807
2018/0370725 A1 * 12/2018 Hognaland ............ B65G 1/137
2019/0168967 A1 * 6/2019 Jin ......................... B65G 1/065
2021/0300678 A1 * 9/2021 Van Buijtene ....... B65G 1/0471
2022/0178084 A1 * 6/2022 Rehling .................. E01B 25/28
(Continued)

FOREIGN PATENT DOCUMENTS

DE 4318383 C1 7/1994
DE 19824290 A1 * 12/1999 ............ H02J 50/005
(Continued)

*Primary Examiner* — Glenn F Myers
(74) *Attorney, Agent, or Firm* — Richard M. Goldberg

(57) ABSTRACT

A storage facility for material panels includes at least one rail-bound basic track with at least one pair of rails and at least one rail-bound transfer track leading to panel depositing locations with at least two pairs of rails, the pair of rails of a basic track and transfer track meeting at right angles, at least one transport device including two carrier vehicles, each having a drive unit, synchronized at a constant distance and jointly accommodating the panels, and one lifting device on each carrier vehicle such that material panels are removable and accommodated on the panel depositing locations, the transport device being movable by a wheel orientation device on a basic track and a transfer track such that the carrier vehicles are movable in parallel on the basic track at a constant spaced distance and on the transfer track at a uniform distance at the same height.

14 Claims, 8 Drawing Sheets

(56) References Cited

U.S. PATENT DOCUMENTS

| | | | | |
|---|---|---|---|---|
| 2022/0388773 | A1* | 12/2022 | Austrheim | B65G 1/0464 |
| 2023/0144676 | A1* | 5/2023 | Heggebø | B65G 1/0407<br>414/279 |

FOREIGN PATENT DOCUMENTS

| | | | |
|---|---|---|---|
| DE | 102022000571 | A1 | 8/2023 |
| WO | 2014/032699 | A1 | 3/2014 |
| WO | 2021/240009 | A1 | 12/2021 |
| WO | 2021/240010 | A2 | 12/2021 |
| WO | 2021/240011 | A2 | 12/2021 |

* cited by examiner 3
9
2
7
1
3.2
3
3.1
6.2
6.1
5
21
4.1
4.2
4
8
2

STORAGE DEVICE FOR MATERIAL PLATES

BACKGROUND OF THE INVENTION

The invention relates to a storage facility for material panels comprising a) at least one rail-bound basic track with at least one pair of rails and at least one rail-bound transfer track leading to panel depositing locations with at least two pairs of rails, wherein the pair of rails of a basic track and the pair of rails of a transfer track meet one another at substantially right angles, b) at least one transport device consisting of two carrier vehicles, each with their own drive unit, which can be synchronized with one another during transport at a constant distance and which can jointly accommodate the material panels to be transported, and c) one lifting device that can likewise be synchronized that is respectively provided on each of the two carrier vehicles, by means of which lifting device material panels can be removed and accommodated on the panel depositing locations in the storage facility.

For definition of the terms used, it is further elucidated:

a storage facility describes the entire facility and area for receiving and storing material panels or stacks of material panels by means of at least one transport device and various panel depositing locations, which are usually arranged at a defined height, a rail-bound transfer track is the rail track which leads through the storage rows directly past the panel depositing locations, a rail-bound basic track is a rail track, usually running at right angles to the transfer track, which leads through the warehouse at a distance from the panel depositing locations or laterally past them, the rails (pairs of rails) referred to here are primarily, but not restricted to, the rails according to DE 4318383 C1 or WO 2014/032699 A1 marketed by the applicant. This type of so-called round rail has proven itself in practice because they are constructed in a simple manner and are thus easy to manufacture. One advantage for fabrication halls is that the rail can be laid out almost flush with the floor, so that other vehicles are not restricted in their freedom of movement. In contrast with trough-shaped rails, in which the wheels of the floor conveyors run, the risk of contamination of the rails is significantly reduced, the carrier vehicles then correspondingly have concave grooved wheels in the circumferential area, so that the rails with a convex top surface section are at least partially immerged in the grooved area of the wheels on contact.

Pair of rails usually means two parallel rails. If, however, the carrier vehicles exceed a certain width, a third or, if necessary, even a fourth rail may need to be laid out in parallel to support the carrier vehicles. This arrangement is to be subsumed in an equivalent manner under the term pair of rails. In this case, at least six and if necessary at least eight wheels or wheel cassettes are required for one direction of travel.

the panel depositing locations are preferably long parallel carrier rows upon which individual material panels or stacks of material panels can generally be deposited at a defined height, wherein the carrier vehicles can pass between the panel depositing locations on the transfer track and unload the material panels lifted by the lifting device at the desired panel depositing location.

Such storage facilities for material panels, such as chipboard, oriented strand board (OSB) or insulation boards, which accordingly comprise a top surface area of more than 1.5 $m^2$, are already known. In fact, they are constructed in a similar manner everywhere. A larger base carriage travels on the basic track, which base carriage usually carries two satellite vehicles. These two satellite vehicles, each as carrier vehicles with their own drive units, in turn carry stacks of material panels and can leave the base vehicle on transfer tracks arranged at right angles to the basic track. The storage units commonly used today consist of three parallel panel depositing locations. The two satellite vehicles can move in the two intermediate spaces between them while they jointly carry material panels. In so doing, the material panels are lifted by means of lifting devices so that they can be moved above the panel depositing locations in appropriate locations. The material panels are then lowered and deposited on the three panel depositing locations. There are numerous patent applications describing this situation and the associated state of the art. WO 2021/240009 A1, WO 2021/240010 A2, WO 2021/240011 A2 and DE102022000571.9, which has not yet been published at the time of the application, may be mentioned here.

All the writings deal with at least one base vehicle that can be moved on rails as well as a plurality of transfer tracks leading to panel depositing locations, and at least one satellite vehicle that can be moved thereon and is capable of moving at least one material panel, wherein a resting place is provided on the base vehicle for at least one satellite vehicle, wherein the base vehicle has an electrical power supply, for example, via a sliding contact, and a drive unit with a base vehicle electric motor, and wherein the satellite vehicle likewise comprises a drive unit with a satellite vehicle motor.

There are various approaches to supply the "piggyback satellites" with power in such a way that they can also move independently of the base vehicle and operate their lifting devices. To date, all of these approaches are still not truly satisfactory. Sliding contacts are vulnerable, cables are a hindrance and charging stations for rechargeable batteries are complex. In particular, however, the control units of base vehicles in interaction with satellite vehicles are often not easy to implement, as radio and WLAN transmissions in the warehouses are often impaired.

Moreover, the satellite vehicles are dependent on being picked up by the base vehicle to transfer to another transfer track via the basic track.

SUMMARY OF THE INVENTION

The task of the invention is to develop a storage facility for material panels in which the described problems with regard to the control of the base carriage-satellite carriage can be avoided.

The task is solved according to the features of the claims and in particular in that the transport device can be moved by a wheel orientation device both on a basic track and on a transfer track in such a way that the carrier vehicles can be moved parallel to one another on the basic track at a constant distance one behind the other and on the transfer track at a uniform distance at the same height. During transport, the distances designated A1 (on the basic track) and A2 (on the transfer track) should be the same.

The wheel orientation device can be used to orient the active wheels, which is to say those that move the transport device along the rails, either in the direction of the basic track or in the direction of the transfer track, which branches off at a right angle. It is not imperative to be individual wheels. In many cases, two or more wheels are also mounted one behind the other in a so-called cassette. In this case, if necessary, the cassette may be rotated by 90° around a vertical axis. When a rotation of the wheels is referred to in the following, this includes the rotation of a cassette. But it can also refer to different sets of wheels rolling on the rails of the basic track or the rails of the transfer track.

The solution according to the invention is many times more flexible than conventional solutions with a basic vehicle and satellite vehicles, since the transport device permits and performs both transverse and longitudinal travel, which is to say on the basic track and the transfer track. At the same time, several transport devices can be located on the basic track and the transfer track without obstructing one another or being dependent on one another.

It is even conceivable that transport devices encountering one another on the basic track avoid one another by one of the transport devices entering a transfer track to let the other oncoming transport device pass.

In order to be able to carry out these variants quickly, it is preferable if the constant distance of the two carrier vehicles on the basic track coincides with the distance of the at least two transfer pairs of rails in such a way that the active wheels can be placed on the transfer rails after activation of the wheel orientation device.

With an exact distance synchronization on the basic track, the at least two carrier vehicles automatically arrive at the intersecting transfer paths at the correct distance. As soon as the wheel orientation device has been activated and the wheels of the carrier vehicles have been switched from the basic track direction to the transfer track direction, the carrier vehicles can turn parallel, in a quasi-right or quasi-left direction, and continue on the transfer tracks. It is particularly important to emphasize that the material panels to be transported retain their position on the two carrier vehicles and are not moved or displaced relative to the entire transport device.

It is advantageous to ensure that the wheel orientation device is connected to the chassis components of the carrier vehicles.

In this manner, means may be provided on each carrier vehicle directly on the chassis which change an orientation of the active wheels from the basic track direction to the transfer track direction.

There are three alternative preferred possibilities for an effective wheel orientation device, which are briefly mentioned in the dependent claims.

As a first possibility, it is advantageous if a rotatable table is respectively provided at rail level in the crossing area of the rails and the wheels of the two carrier vehicles are rotatably mounted about a vertical axis.

Then, by rotating a table, a wheel standing on it can also be rotated to change the direction of travel of the carrier vehicle. It is irrelevant whether the rotational drive is provided on the wheel or on the table. With sufficient weight and sufficient friction, the table does not even need a rail or groove for the wheel, but rather can have a perfectly smooth top surface. As already mentioned, wheels here are also understood to include cassettes with two or three wheels, as long as they can fit on a rotary table.

In the case of this arrangement, it is imperative that all wheels of both carrier vehicles are on rotary tables so that the transport device can change from one direction of travel to another. For this reason, the constant distance of the two carrier vehicles on the basic track must imperatively be maintained.

As a second possibility to create an effective wheel orientation device, it is advantageous that the wheels of the carrier vehicle are rotatably mounted in a motor-driven manner about a vertical axis, and for them to be relieved of load at least briefly by at least one pressure piston with actuator which is suitable for lifting the carrier vehicle until the wheels are rotated through about 90°.

Such a pressure piston makes it possible to relieve each wheel or cassette in such a way that it can be rotated relative to the carrier vehicle with little effort. The pressure piston thereby acts against an area of the crossing of the rails and relieves the wheels by exerting counterpressure so that they no longer bear the load of the carrier vehicles and the material panels to be transported. Instead, this load is now taken over by the pressure piston. This makes it possible to integrate all the components required for changing the direction in the floor conveyor element and accordingly simplifies their control as well as the construction of the rail system.

By raising the wheels and carrier vehicle off the rails, the end of the pressure piston facing the rails extends downward beyond the running surface of the at least one wheel so that no part of the wheel is in contact with any part of the rail system. This enables the wheels or alternatively cassette to rotate freely and without resistance relative to the carrier vehicle.

As a third possibility to create a wheel orientation device, it is advantageous to have a lifting fixture that is suitable to raise the wheels of the carrier vehicles standing on the rails of the basic track while it lowers other wheels onto the rails of the transfer track or vice versa.

This third possibility will be elucidated in more detail in the later description of the embodiments, inasmuch as it has already been tested in the experimental field.

In this version, the chassis has two sets of wheels. The first set is oriented in the direction of the basic track, the second in the direction of the transfer track. All wheels are coupled to at least one lifting fixture, wherein one of the sets is in contact with rails, while the other set is lifted off the rails. The change-over of the sets which have contact with the rails takes place in the crossing area of the basic track and of the transfer track. Here too, these operations must be capable of being performed in a synchronized manner for both carrier vehicles.

In this third version, it is particularly preferred if a first chassis with the wheels for the rails of the basic track and a second chassis with the wheels for the rails of the transfer track can be moved relative to one another by the lifting fixture.

The lifting fixture can lower the first chassis while it raises the second chassis, or precisely the opposite. As a result, either the wheels of the first chassis or the wheels of the second chassis come into engagement or contact with the associated rails. A particularly effective and advantageous arrangement is when the first chassis is overlaid on top of the second chassis. A lifting fixture between these chassis then allows the first chassis to be lowered so far that its wheels touch down on rails. At the same time, or subsequently, the second chassis with its wheels can be lifted off the rails. Similarly, in the case of a change in direction, the reverse process can also take place.

In a constructionally preferred embodiment, the first chassis is configured as a downwardly open cuboid, which is to say with four side walls and a cover surface. On the top, the cover surface becomes the support surface for the material panels. At least four wheels are attached to the lower edges of the cuboid, which wheels run, for example, on the rails of the basic track. The second chassis, that also has at least four wheels that can, for example, run on the rails of the transfer track, is inserted from below into the opening of the first chassis. The lifting device between the two chassis ensures that the direction of travel can be changed by either placing the first or the second chassis on the assigned rails.

Thus, with particular advantage, it is ensured that both the lifting device and the lifting fixture comprise the same actuators.

Note once again the terminology used, according to which a lifting device serves to raise and lower the material panels to be transported, while a lifting fixture determines the active wheels on the rails of the basic track or on those of the transfer track.

If, in this case, the support surface of the carrier vehicle is firmly connected to the first chassis, then like actuators, preferably even the same actuators, can be used for the lifting device and the lifting fixture. If, by way of example, the first chassis (preferably the one overlaid on top of the second chassis) is lowered with the support surface so that the wheels are in contact with the rails, then the lower edge of the material panels is also in the lowest possible transport position. This situation is however very suitable for transportation on the basic track. If, subsequently, the first chassis is raised and the second chassis is lowered in order to switch to the transfer track, then the lower edge of the material panels is in a slightly higher position, which is of benefit for placement on the panel depositing locations. In this manner, there is a corresponding advantage if at least one height position is coupled with lowered wheels and thus wheels in contact on the rails of the basic track and at least one other height position is coupled with lowered wheels and thus wheels in contact on the rails of the transfer track.

However, it is also advantageous if each lifting device is suitable to approach several height positions for the support surfaces of the carrier vehicle and thus the lower edge of the material panels to be transported.

In this manner, it is particularly easy to move the material panels to their storage position above the panel depositing locations and to then set them down on the panel depositing location by lowering the lifting device to a second, lower height position in which the lower edge of the material panel would theoretically be below the panel depositing location.

Thus, it is preferred that at least two height positions for the support surfaces of the carrier vehicle can be set during transport on the transfer track, one in which the support surface, and thus the lower edge of the material panels to be transported, lies above and one in which the lower edge of the material panels to be transported lies below the panel depositing location in the storage facility.

The preferred means of supplying energy to the carrier vehicles are induction loops which generate a magnetic field and are accommodated, for example, parallel to the rails in the work hall floor. The vehicles accordingly have a receiver unit in the form of at least one further coil through which the generated magnetic field flows. The generated current is conventionally stored in rechargeable batteries or power storage devices. By definition, this also includes capacitors in the present invention. In this manner, there is always enough energy available for the travel drive units, the lifting device, and the lifting fixture. The lifting device and the lifting fixture can, for example, operate hydraulically via electrically driven pumps or directly via electric spindle drive units.

Separate charging stations or charging points can also be provided for efficient charging of the rechargeable batteries.

However, this preferred power circuit need not be provided if the basic principle of the invention is satisfied. By way of example, a conventional power supply, for example, via cables with winding drums, is also intended to be covered by the invention.

In order to ensure that the two carrier vehicles remain at a constant distance one behind another on the basic track and remain at a uniform distance parallel to one another at the same height on the transfer tracks, it is advantageous when a control unit receives the actual data of the carrier vehicle by means of a rotary encoder on at least one of the wheels. This precise determination of the current position makes it possible to adjust the drive units of the carrier vehicles.

In particular at the intersections of the rails of the basic track and the rails of the transfer track, it can additionally be useful to record the exact position of the wheels by means of transponders. A positioning or alternatively rotation of the wheels about a vertical axis can thereby be ensured when changing the direction of travel at a crossing of the rails.

Preferably, there are at least two parallel basic tracks in the storage facility. This allows the uncomplicated use of a plurality of transport devices, consisting of two carrier vehicles. In the case of two transport devices approaching one another, one of them can easily move aside on to the second basic track via a transfer track. Moreover, two basic tracks allow the transport device to approach the panel depositing locations from two sides, which also makes it much easier to accommodate and deposit the material panels in the storage facility.

BRIEF DESCRIPTION OF THE DRAWINGS

The invention is explained hereinafter with reference to the illustrative drawings. Wherein:

FIG. 7*a* and FIG. 7*b* show an alternative wheel orientation device with piston for lifting and turning the wheels.

DETAILED DESCRIPTION

Figure 1:
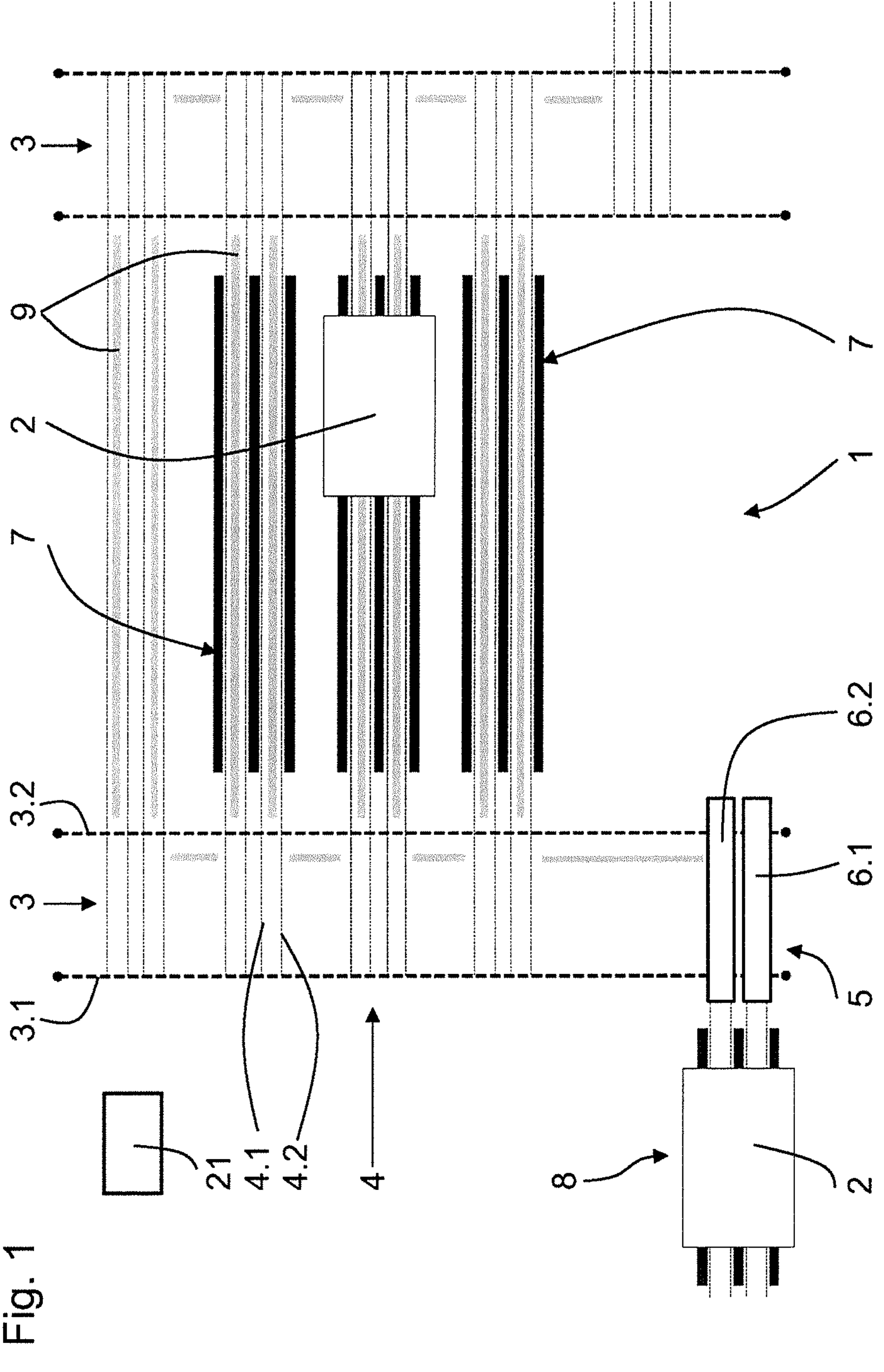
FIG. 1 shows a schematic top view of a storage facility according to the invention.

The schematic diagram in FIG. 1 is more or less a top view of the storage facility 1 for material panels (stack) 2, with basic tracks 3, which have rails 3.1, 3.2 and transfer tracks 4, which have rails 4.1, 4.2. When speaking of pairs of rails, each pair of rails involves either one rail 3.1 and one rail 3.2 on the basic track or one rail 4.1 and one rail 4.2 on the transfer track. Transport devices 5, which are suitable for carrying the material panels (stack) 2 can travel on both tracks 3, 4. Material panels and stacks of material panels are referred to in the following only as material panels 2. Each transport device 5 consists of two carrier vehicles 6.1, 6.2, each with their own drive unit, wherein a control unit 21 ensures that carrier vehicles 6.1, 6.2 travel on the basic track 3 at a constant distance A1 one behind the other and on the transfer track 4 at a uniform distance A2 parallel to one another at the same height. To enable the carrier vehicles to travel both on the basic track 3 and on the transfer track 4, a wheel orientation device 10 is provided, which is shown and elucidated in several alternatives in the further course of the description and figures.

The two carrier vehicles 6.1, 6.2 can travel on the transfer tracks 4 and at the panel pick-up location 8 located precisely between three beam-shaped panel depositing locations 7 for the material panels 2. The support surface 24 of the carrier vehicles 6.1, 6.2 can be raised and lowered in a synchronized manner by means of a lifting device 25, which will be elucidated in more detail below. In this manner, material panels are raised by means of lifting devices 25 when the storage bins are loaded so that they can be moved above the panel depositing location 7. At a suitable point, the material panels 2 are then lowered and deposited on the three panel depositing locations 7. The carrier vehicles can then move freely underneath the material panels. The process is correspondingly reversed when unloading and picking up material panels 2, not only from the panel depositing locations 7 but also at the panel pick-up location 8.

In order to maintain clarity in FIG. 1, the rails 3.1, 3.2 of the basic track 3 are dashed, the rails 4.1, 4.2 of the transfer track 4 are shown by thin lines, the panel depositing locations 7 by thick black lines and induction loops 9 for power supply are shown in gray.

Figure 2:
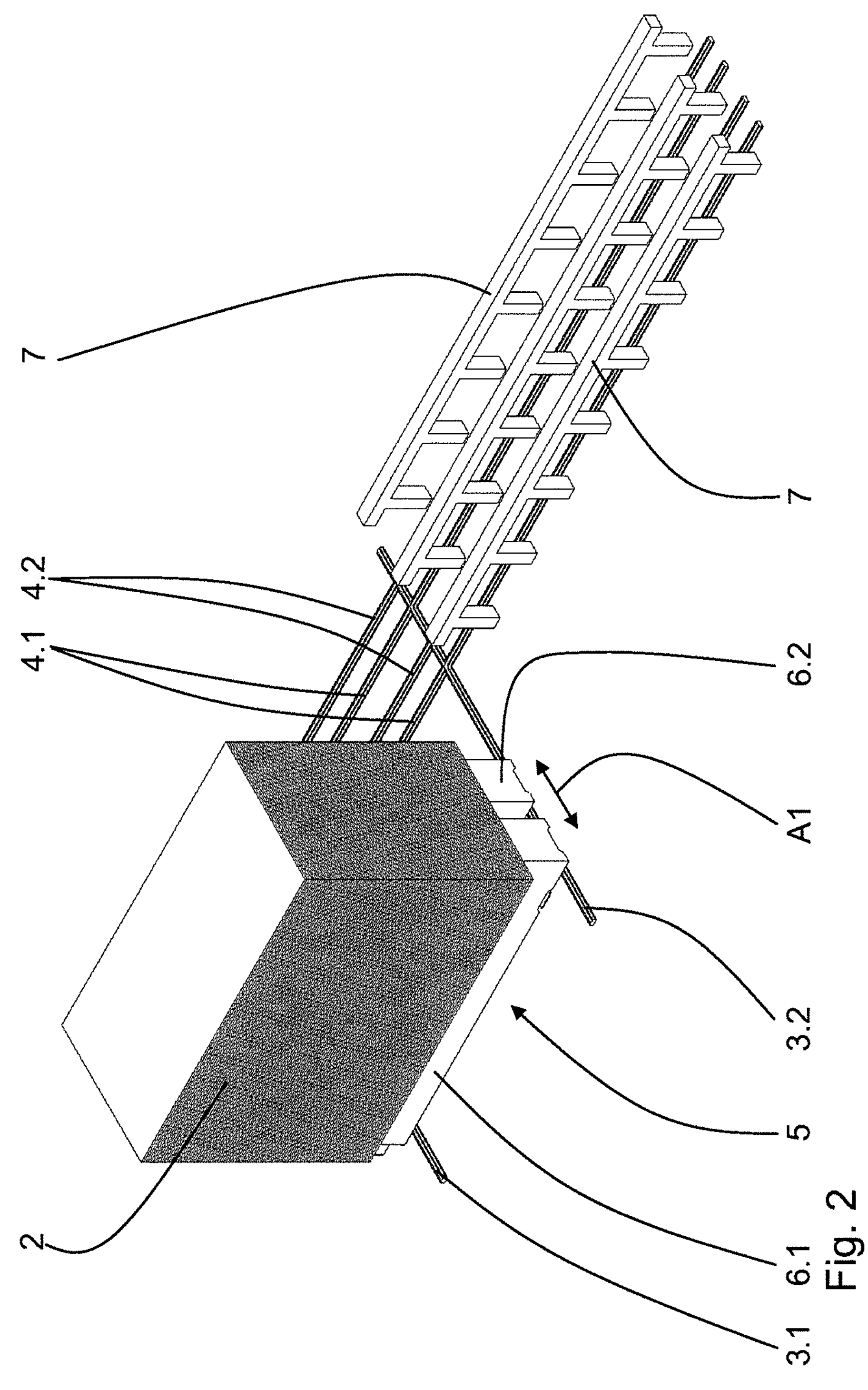
FIG. 2 shows a three-dimensional view of a transport device for material panels with basic track and transfer track leading to the panel depositing locations.

In FIG. 2, a short section of the basic track 3 and of the transfer track 4 is drawn in three dimensions. Two carrier vehicles 6.1, 6.2, which form the transport device 5, can be seen on the rails 3.1, 3.2 of the basic track 3. They jointly carry material panels 2. The reference sign A1 indicates that the carrier vehicles 6.1, 6.2 always maintain the same distance. By means of the wheel orientation device 10 (which is explained in more detail in reference to FIG. 5 through FIG. 8), the carrier vehicles 6.1, 6.2 are able to, so to speak, turn right and continue on the rails 4.1, 4.2 of the transfer track 4. For each carrier vehicle 6.1, 6.2 such a pair of rails 4.1, 4.2 is provided, wherein the pairs of rails run exactly parallel, each pair of rails between two panel depositing locations 7.

Figure 3B:
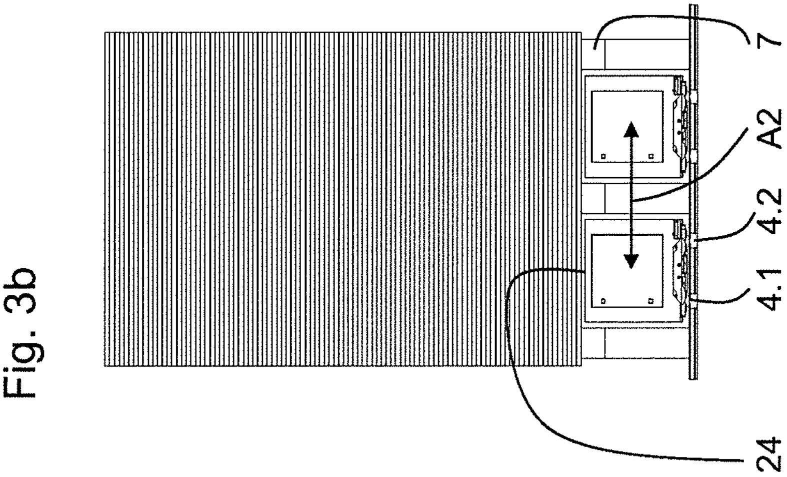
FIG. 3*a* and FIG. 3*b* show carrier vehicles between the panel depositing locations with different height positions of the support surfaces.
Figure 3A:
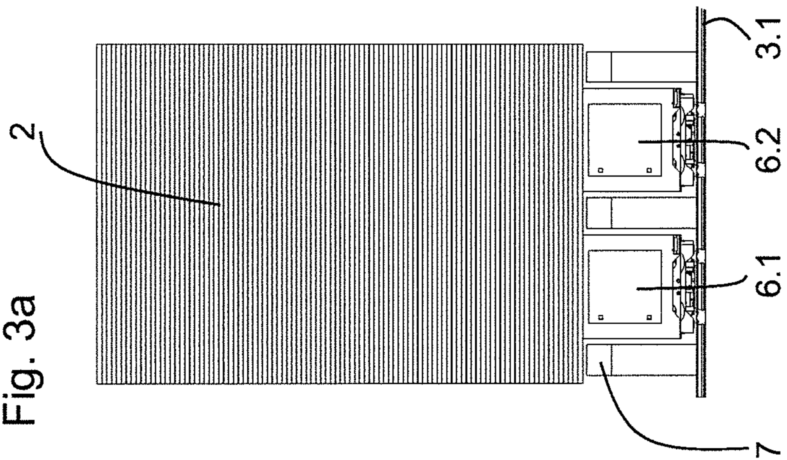

FIGS. 3*a* and 3*b* illustrate how the two carrier vehicles 6.1, 6.2 can travel between three panel depositing locations 7. The reference sign A2 indicates that the carrier vehicles 6.1, 6.2 always maintain the same distance, which is to say that they always travel parallel at the same height. During transport, the distances A1 and A2 are the same.

FIG. 3*a* shows how the carrier vehicles 6.1, 6.2 transport material panels 2 at a small height above the panel depositing locations 7. The support surface 24 of the transport device 5 is therefore slightly higher than the support on the panel depositing locations 7. In this case, the support surface 24 is raised by a lifting device 25 not shown here. In contrast, the support surface 24 in FIG. 3*b* is once again lowered so that the material panels are placed on the panel depositing locations 7.

Figure 4:
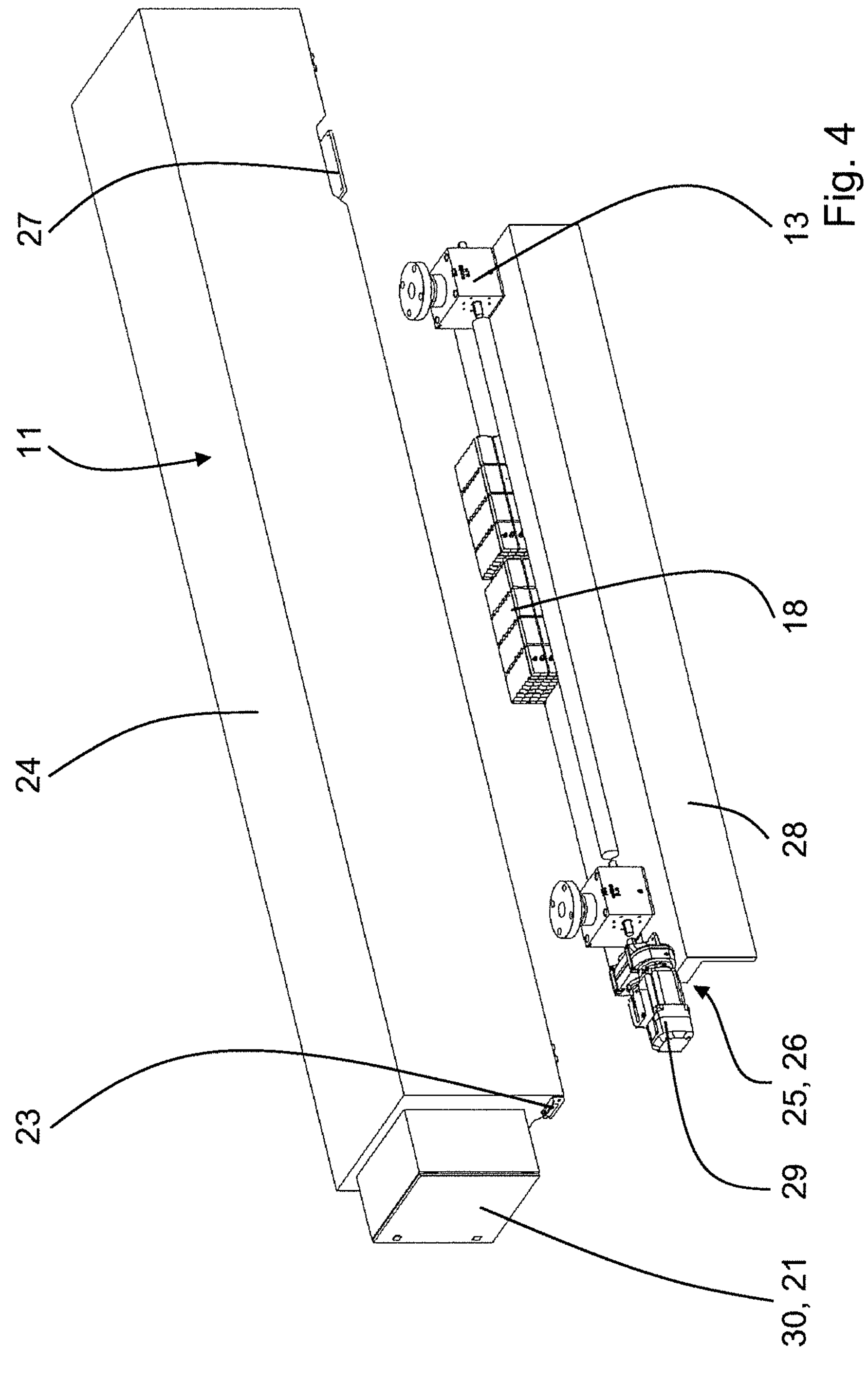
FIG. 4 shows a first chassis in three-dimensional view with removable lifting device.

FIG. 4 is a kind of exploded view showing the first chassis 11 of a carrier vehicle 6.1, 6.2 with a cavity and the lifting device 25 that can be accommodated therein, as well as the rechargeable batteries 18 for power storage on a carrier 28. In this embodiment, the rechargeable batteries 18 are powered by means of an inductive receiver unit 27. The stored current can be used to operate the lifting device 25 in addition to the drive units for the carrier vehicle 6.1, 6.2, which are not shown. In this embodiment, the lifting device 25 comprises an electric motor 29 and two coupled actuators 13, which actuators can raise and lower the first chassis 11 in the installed state and thus also the support surface 24 for the material panels 2.

A transponder 23 is furthermore indicated in FIG. 4, which transponder can transmit, by means of a signal transmitter not shown, the exact position of the carrier vehicle 6.1, 6.2 (in particular, in the crossing area of the rails) to the control unit 21 located externally or in the switch box 30, so that the constant distance A1 can be synchronized.

Figure 5:
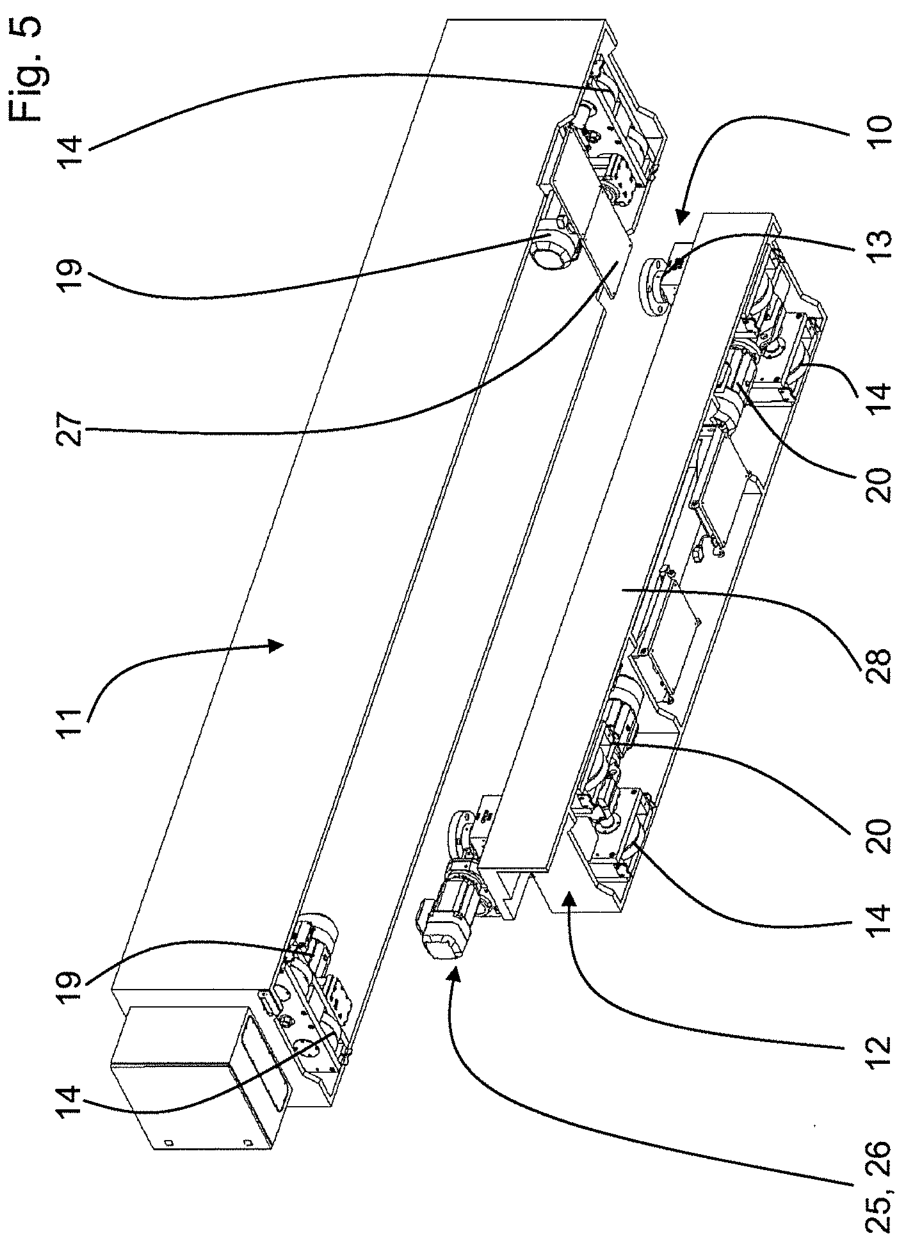
FIG. 5 shows a first chassis in three-dimensional view from below with insertable second chassis.
Figure 6:
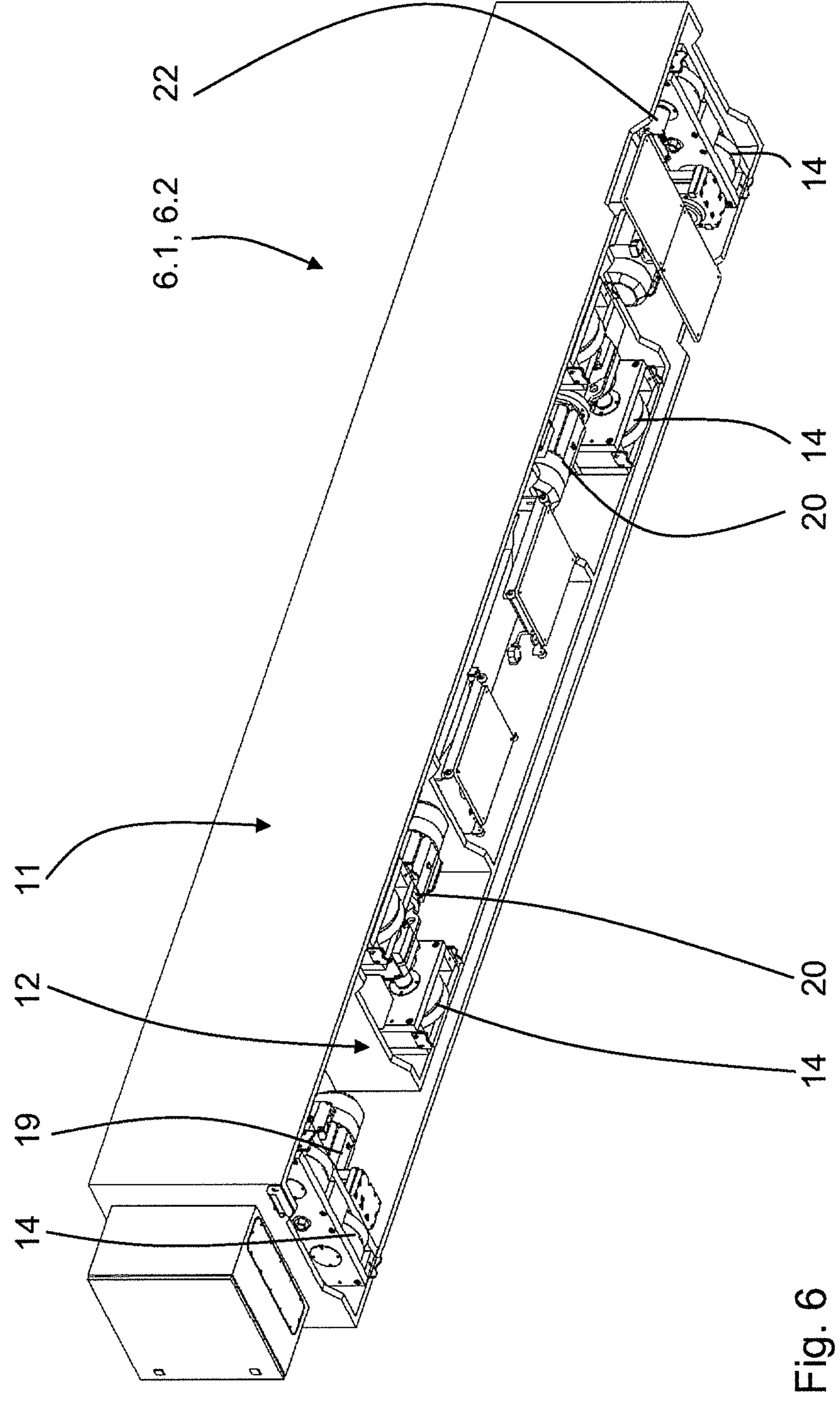
FIG. 6 shows a first chassis overlaid on top of the second chassis in three-dimensional view from below.

FIG. 5 also illustrates the installation of the second chassis 12 in the first chassis 11 in an exploded-like view, this time in a view from below. Lastly, FIG. 6 shows the first chassis 11 overlaid on top of the second chassis 12 in a similar manner. The wheels 14 of the chassis 11, 12 can be seen. In this embodiment, the first chassis 11 is provided for the basic track 3 and the drive units for the basic track 3 bear the reference sign 19. The second chassis 12 is provided for the transfer track 4 and the drive units for the transfer track 4 bear the reference sign 20. A rotary encoder 22 is indicated in order to make the exact position of the carrier vehicle 6.1, 6.2, determinable.

Depending on how far the actuator 13 is extended in the lifting device 25, it is not only decided how high the support surface 24 with the material panels 2 is lifted. Rather, the actuator 13 at the same time forms a lifting fixture 26 that determines whether it will be the wheels 14 of the drive units 19 for the basic track 3 or the wheels 14 of the drive units 20 for the transfer track 4 that touch down on the corresponding rails. At this point, it should be noted once again the terminology according to which a lifting device 25 serves to raise and lower the material panels 2 to be transported, while a lifting fixture 26 defines the active wheels 14 on the rails of the basic track 3 or those of the transfer track 4. At crossing points of the rails 3.1, 3.2 or 4.1, 4.2, when the actuator 13 is retracted, the wheels 14 of the drive units 19 for the basic track 3 will be on the rails, whereas, when the actuator is extended, the wheels 14 of the drive units 20 for the transfer track 4 will be on the rails. In the constructionally preferred embodiment, the first chassis 11 is designed as a downwardly open cuboid, which is to say with four side walls and a cover surface. On top, the cover surface becomes a support surface 24 for the material panels 2. At least four wheels 14 are attached to the lower edges of the first chassis 11, which wheels, for example, run on the rails 3.1, 3.2 of the basic track 3. The second chassis 12 is introduced from below into the opening of the first chassis 11, and likewise has at least four wheels 14 which can be positioned, for example, on the rails 4.1, 4.2 of the transfer track 4. The lifting fixture 26 between the two chassis 11, 12 ensures that the direction of travel can be changed by placing either the first or the second chassis on the associated rails.

This preferred switching by a wheel orientation device 10 of the direction of travel is particularly simply constructed. There are, however, also two alternative possibilities which are also intended to be covered by the invention and which are explained in FIGS. 7 and 8.

In both cases, one gets by here with only one chassis 11. As in the previous embodiment, the wheels 14 run on the round rails 3.1, 3.2, 4.1, 4.2.

Figures 7A, 7B:
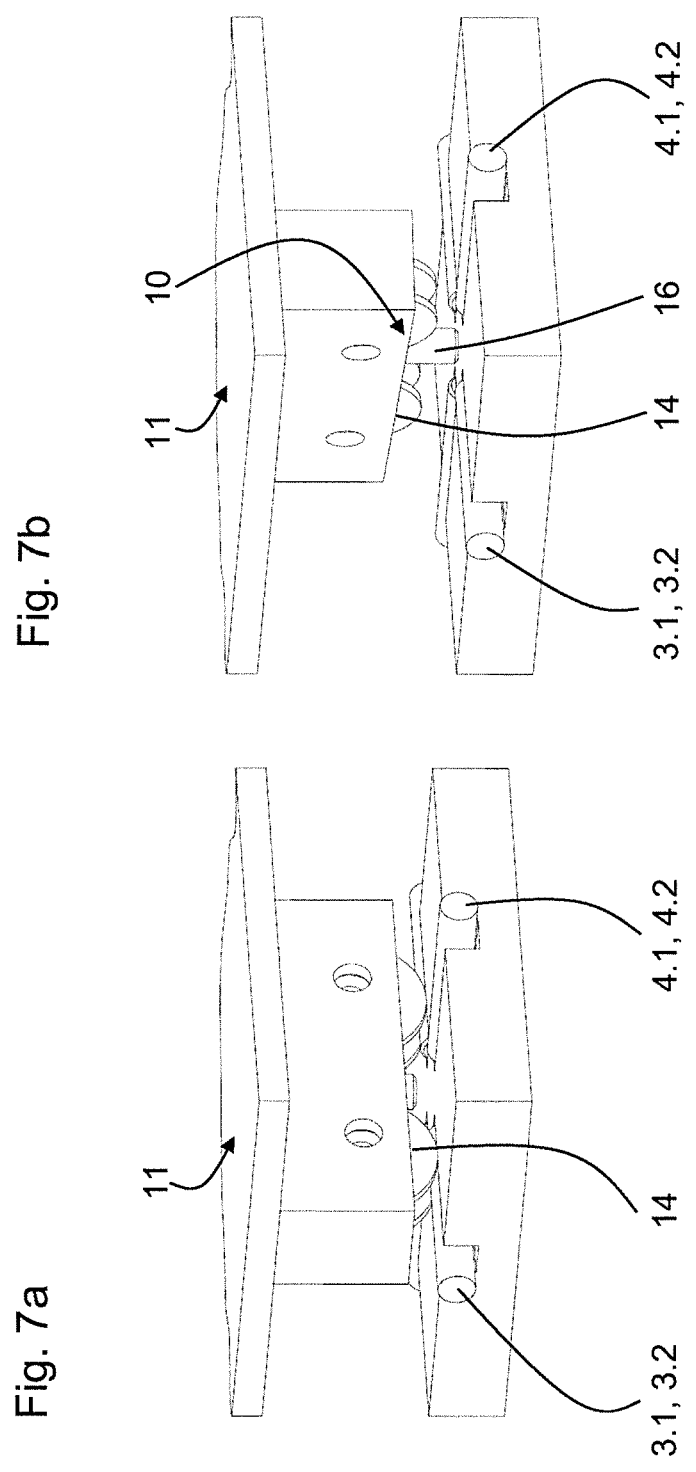

According to FIG. 7*a* and FIG. 7*b*, two wheels 14 are located in a wheel cassette. An extendable piston 16 is arranged between the wheels. When this piston extends precisely at the intersection of two rails, the rotatably mounted wheel cassette, which is lifted from the rails, can be rotated by a motor by 90° about a vertical axis corresponding to the longitudinal axis of the piston 16.

When the piston 16 once again retracts, the wheels 14 are automatically positioned on the crossing rails. This process of the wheel orientation device 10 must be initiated simultaneously for all wheels or wheel cassettes 14 of the two carrier vehicles 6.1, 6.2.

Figure 8:
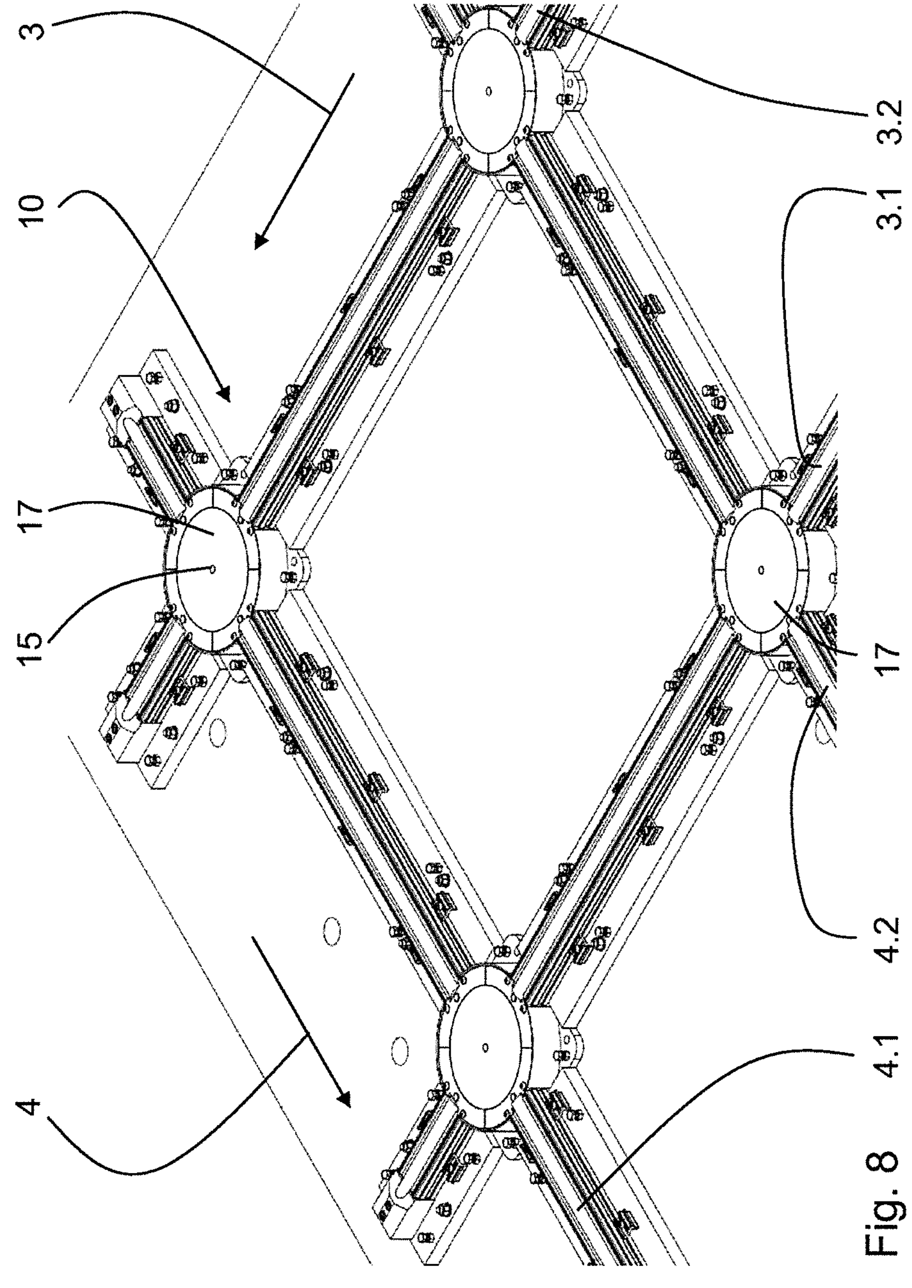
FIG. 8 shows a further alternative wheel orientation device with rotary tables at the crossing point of the rails by means of which rotary tables the wheels can be turned.

FIG. 8 alternatively shows an embodiment of a wheel orientation device 10, which is arranged on at least four rotary tables 17 in the crossing area of rails 3.1, 3.2, 4.1, 4.2. If the axis of rotation of the rotary table 17 coincides with the vertical axes of rotation of the wheels or wheel cassettes 14, the wheels can be rotated by 90°. In so doing, the rotational drive (not shown) can be carried out both via the wheel 14 as well as via the rotary table 17. As in the previous embodiments, the wheel orientation device 10 must always be activated simultaneously for all wheels 14 of the two carrier vehicles 6.1, 6.2.

LIST OF REFERENCE SIGNS

1 Storage facility
2 Material panels (stack)
3 Basic track
3.1, 3.2 Basic track rails
4 Transfer track
4.1, 4.2 Transfer track rails
5 Transport device
6.1, 6.2 Carrier vehicle
7 Panel depositing location
8 Panel pick-up location
9 Induction loop
10 Wheel orientation device
11 First chassis
12 Second chassis
13 Actuator
14 Rotatable wheel or wheel cassette
15 Axis of rotation
16 Piston
17 Rotary table
18 Rechargeable battery, power storage device, capacitor
19 Basic track drive unit
20 Transfer track drive unit
21 Control unit
22 Rotary encoder
23 Transponder
24 Support surface
25 Lifting device
26 Lifting fixture
27 Receiver unit
28 Carrier
29 Electric motor
30 Switch box
A1, A2 Distance

What is claimed is:

1. A storage facility for material panels comprising:

at least one rail-bound basic track with at least one pair of rails, at least one rail-bound transfer track leading to panel depositing locations and having at least two pairs of transfer rails, wherein each pair of rails of a basic track and each pair of rails of a transfer track meet one another at substantially right angles at a crossing area, at least one transport device including two carrier vehicles, each carrier vehicle with its own drive unit, which carrier vehicles are adapted to be synchronized with one another during transport at a constant distance and which are adapted to jointly accommodate the material panels to be transported, one lifting device that is adapted to be synchronized with the carrier vehicles and which is respectively provided on each of the two carrier vehicles, wherein the material panels are adapted to be removed and accommodated on the panel depositing locations in the storage facility, and a wheel orientation for moving the transport device both on a basic track of said at least one rail-bound basic track and on a transfer track of said at least one rail-bound transfer track in such a way that the carrier vehicles are adapted to be moved parallel to one another on the basic track at a constant distance one behind the other and on the transfer track at a uniform distance at the same height, wherein each lifting device is suitable to approach several height positions for a support surface of the carrier vehicle on which the material panels are supported, and wherein at least two height positions are adapted to be set during transport on the transfer track, one in which the support surface of the material panels to be transported lies above and one in which the support surface of the material panels to be transported lies below the panel depositing location in the storage facility.

2. A storage facility according to claim 1, wherein the carrier vehicles include wheels and the constant distance of the two carrier vehicles on the basic track coincides with the distance of the at least two pairs of transfer rails on the transfer track in such a way that, after activation of the wheel orientation device, active ones of the wheels of the carrier vehicles are adapted to be moved on the transfer rails.

3. A storage facility according to claim 1, wherein the carrier vehicles each include a chassis component, and the wheel orientation device is connected to the chassis components of the carrier vehicles.

4. A storage facility according to claim 1, further comprising a rotatable table provided in the crossing area of the rails at a rail height, and wherein:

the carrier vehicles include wheels and the wheels of the carrier vehicles are mounted rotatably about a vertical axis.

5. A storage facility according to claim 1, wherein:

the carrier vehicles include wheels and the wheels of the carrier vehicles are mounted in a motor-driven manner rotatably about a vertical axis and further comprising at least one pressure piston associated with each carrier vehicle for relieving a load of the carrier vehicle at least briefly by lifting the carrier vehicle until the wheels thereof are rotated through about 90°.

6. A storage facility according to claim 1, wherein the carrier vehicles include wheels and further comprising a lifting fixture for raising the wheels of the carrier vehicles standing on the rails of the basic track while lowering other wheels onto the rails of the transfer track, and vice versa.

7. A storage facility according to claim 6, wherein each carrier vehicle includes a first chassis with the wheels for the rails of the basic track and a second chassis with the wheels for the rails of the transfer track, and further comprising a lifting fixture for moving the first chassis and the second chassis relative to one another.

8. A storage facility for material panels comprising:

at least one rail-bound basic track with at least one pair of rails, at least one rail-bound transfer track leading to panel depositing locations and having at least two pairs of transfer rails, wherein each pair of rails of a basic track and each pair of rails of a transfer track meet one another at substantially right angles at a crossing area, at least one transport device including two carrier vehicles, each carrier vehicle with its own drive unit, which carrier vehicles are adapted to be synchronized with one another during transport at a constant distance and which are adapted to jointly accommodate the material panels to be transported, one lifting device that is adapted to be synchronized with the carrier vehicles and which is respectively provided on each of the two carrier vehicles, wherein the material panels are adapted to be removed and accommodated on the panel depositing locations in the storage facility, and a wheel orientation for moving the transport device both on a basic track of said at least one rail-bound basic track and on a transfer track of said at least one rail-bound transfer track in such a way that the carrier vehicles are adapted to be moved parallel to one another on the basic track at a constant distance one behind the other and on the transfer track at a uniform distance at the same height, wherein the carrier vehicles include wheels, further comprising a lifting fixture for raising the wheels of the carrier vehicles standing on the rails of the basic track while lowering other wheels onto the rails of the transfer track, and vice versa, and wherein both the lifting device and the lifting fixture comprise the same actuators.

9. A storage facility for material panels comprising:

at least one rail-bound basic track with at least one pair of rails, at least one rail-bound transfer track leading to panel depositing locations and having at least two pairs of transfer rails, wherein each pair of rails of a basic track and each pair of rails of a transfer track meet one another at substantially right angles at a crossing area, at least one transport device including two carrier vehicles, each carrier vehicle with its own drive unit, which carrier vehicles are adapted to be synchronized with one another during transport at a constant distance and which are adapted to jointly accommodate the material panels to be transported, one lifting device that is adapted to be synchronized with the carrier vehicles and which is respectively provided on each of the two carrier vehicles, wherein the material panels are adapted to be removed and accommodated on the panel depositing locations in the storage facility, and a wheel orientation for moving the transport device both on a basic track of said at least one rail-bound basic track and on a transfer track of said at least one rail-bound transfer track in such a way that the carrier vehicles are adapted to be moved parallel to one another on the basic track at a constant distance one behind the other and on the transfer track at a uniform distance at the same height, wherein each lifting device is suitable to approach several height positions for a support surface of the carrier vehicle on which the material panels are supported, and wherein at least one height position is coupled with lowered wheels and thus wheels in contact on the rails of the basic track and at least one other height position is coupled with lowered wheels and thus wheels in contact on the rails of the transfer track.

10. A storage facility according to claim 1, further comprising induction loops for supplying energy to the carrier vehicles.

11. A storage facility according to claim 10, further comprising rechargeable batteries for storing electrical energy on the carrier vehicles.

12. A storage facility according to claim 1, wherein the carrier vehicles include wheels, and further comprising:

a control unit for maintaining the distance between two carrier vehicles, and rotary encoders on at least one wheel for supplying data to the control unit.

13. A storage facility according to claim 1, further comprising at least one transponder for one of:

the pair of rails of a basic track, the pair of rails of a transfer track or both the pair of rails of the basic track and transfer track in order to ensure an exact position at a crossing of the rails.

14. A storage facility according to claim 1, wherein at least two parallel basic tracks are provided in the storage facility.

* * * * *